Patented May 15, 1951

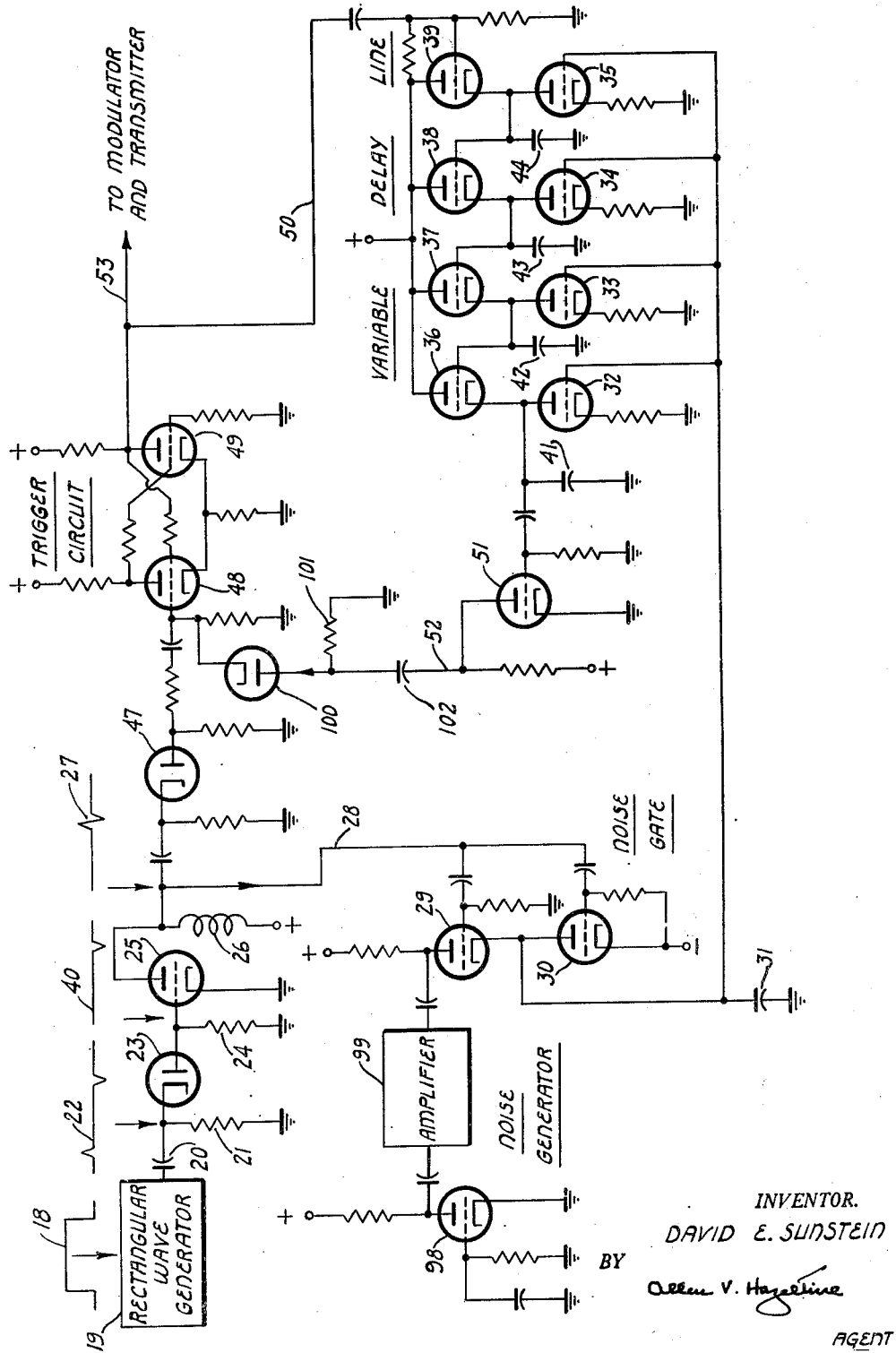

2,553,284

UNITED STATES PATENT OFFICE 2,553,284

GENERATOR OF TIME-SPACED PULSE SIGNALS OF VARYING DURATION

David E. Sunstein, Cynwyd, Pa., assignor to Philco Corporation, Philadelphia, Pa., a corporation of Pennsylvania Continuation of applications Serial No. 793,742, December 24, 1947, and Serial No. 34,881, June 24, 1948. This application March 17, 1949, Serial No. 81,888

8 Claims. (Cl. 250—27)

The invention herein described and claimed relates to novel and improved means for generating time-spaced electrical pulse signals of varying duration, and in particular to such means in which the durations of successively generated pulse signals are determined in response to the instantaneous value of a predetermined characteristic of a control signal which varies as a function of time. More particularly, the invention contemplates varying the durations of the generated pulses in a random manner in response to a control signal having a characteristic which varies randomly with time. In the latter instance the invention is particularly adapted for use in radar systems where it is desired to transmit pulses of high frequency energy of randomly varying duration in an endeavor to minimize the deleterious effects of hostile countermeasures. Such a radar system, employing the present invention, is described in my copending application Serial No. 34,881, filed June 24, 1948, for Variable Duration Pulse Radar System, my present application being a continuation of said application and of application Serial No. 793,742, filed December 24, 1947, for Electrical System, said latter application having since been abandoned. However, it is to be understood that the present invention is not limited to this application but is generally usable wherever it may be desired to generate time-spaced pulses of duration which varies either randomly or in accordance with a predetermined function of time. Thus, for example, the invention is applicable in a duration-modulated pulse communication system.

Accordingly the principal object of the invention is to provide novel and improved means for generating time-spaced electrical pulse signals of varying duration.

Another object of the invention is to provide means for generating time-spaced electrical pulse signals of varying duration and whose durations are determined in accordance with the instantaneous value of a predetermined characteristic of a time-varying control signal at successive instants of time.

Still another object of the invention is to provide means for generating time-spaced electrical pulse signals whose durations vary in a random manner.

The invention will be described with reference to a representative embodiment thereof suitable for generating time-spaced pulse signals whose durations vary randomly. The single drawing accompanying this specification is a schematic diagram of such an embodiment.

Referring to the figure, rectangular wave generator 19 may be any suitable generator of recurrent pulses 18, which pulses are preferably of substantially rectangular wave-form and may be of relatively long duration compared to their spacing. These pulses are differentiated in a circuit comprising condenser 20 and resistor 21 to produce appreciably shorter duration pulses 22 timed by the leading and trailing edges of pulses 18. The negative pulses resulting from differentiation are selected by diode 23 and applied to the grid of amplifier tube 25, in the output circuit of which is connected a differentiating inductor 26. The latter differentiates the narrow negative pulses 40 to yield closely spaced positive and negative pips or pulses 27 corresponding respectively to the falling and rising portions of pulses 40. The positive pips, applied through connection 28 to the grids of tubes 29 and 30, cause these tubes to conduct. Tubes 29 and 30, the plate-cathode circuits of which are connected in series, constitute a noise gate in the form of a conventional clamping circuit well known in the art and frequently used in radar systems. A signal of randomly varying amplitude, from a noise generator comprising plate current saturated vacuum tube 98 and associated circuits, is amplified in amplifier 99 and supplied to the plate of tube 29. When tubes 29 and 30 are caused to conduct in response to a positive impulse applied to their grids through connection 28, condenser 31, connecting the cathode of tube 29 and the plate of tube 30 to ground, will commence to discharge through tube 30. However, at the same time, it will commence to be charged through tube 29 to a new potential determined by the instantaneous value of the amplitude of the noise signal applied to the plate of tube 29 at the instant that tube 29 is conducting. The final potential assumed by condenser 31 at the end of the conducting period of tubes 29 and 30 will, except as modified by stray leakage, remain substantially constant until tubes 29 and 30 are again caused to conduct and re-establish the potential of condenser 31 in accordance with a later instantaneous value of the noise signal from amplifier 32. During these intervals the potential across condenser 31 is applied to the grids of tubes 32—35, connected respectively in the cathode circuits of tubes 36—39. Tubes 32—39 cooperate with condensers 41—44, connected as shown, to provide a multi-section variable delay line, the delay of which is determined by the potential applied to the grids of tubes 32—35 from condenser 31. This delay line comprises, in effect, a plurality of cascaded RC sections, each consisting of one of the condensers 41—44 and a fraction of the plate impedance of the triode, to the cathode of which one of the condenser plates is connected. This fraction is determined by the mutual conductance of the triode, and its magnitude is variable in response to variations in the plate current in the triode. The latter is, in turn, controllable throughout a relatively wide range through the medium of a second triode connected in the cathode circuit of the first. Thus, for example, the delay of the section comprising tubes 33 and 37 and condenser 42 will vary as the potential of the grid of tube 33 is varied. Varying the potentials of the grids of each of tubes 32—35 in unison in the same sense will yield a cumulative delay of appreciable and varying magnitude throughout the several sections of the delay line. This arrangement, well known in the art, is fully described in copending application of Millard E. Ames, Jr., Serial Number 563,699, filed November 16, 1944, now Patent No. 2,506,329, issued May 2, 1950, and assigned to Philco Corporation, which application also describes other equivalents which may be substituted for the specific delay line here shown.

Thus it will be seen that the delay of the variable delay line is established by the potential across condenser 31, which, in turn, is periodically re-established to a random value determined by the instantaneous value of a noise signal at the time of occurrence of the positive pips of wave-form 27, and is maintained at this value until the occurrence of a subsequent positive pip. The negative pips of the wave-form 27 developed across inductor 26 are selected through the action of diode 47 and are applied to the grid of tube 48, which, together with tube 49 and associated connections, forms a conventional Eccles-Jordan trigger circuit, which is so well known as not to require further description. The negative pulses applied to the grid of tube 48 will cut it off, and at the same time will cause tube 49 to commence conducting. It will be noted that this actuation of the trigger circuit occurs just after the redetermination of the delay of the variable delay line by the potential across condenser 31 in response to a positive pip of wave-form 27. Negative impulses caused to appear on the plate of tube 49 are supplied through connection 50 to the variable delay line. Delayed negative impulses from the output of the delay line are inverted in inverter tube 51 and applied through connection 52 to the grid of tube 48 of the trigger circuit to cause it again to conduct. Thus the trigger circuit is caused to generate negative pulses 54 which appear on the plate of tube 49 and which vary in duration depending upon the amount of delay introduced by the variable delay line. These pulses of randomly varying duration are available for supply through connection 53 to any desired utilization device.

As mentioned in the preceding paragraph, when tube 48 is rendered non-conductive in response to the negative pip applied to its grid from diode 47, tube 49 will commence to conduct, and the decrease in potential of the plate of that tube will be transmitted through the variable delay line, inverter tube 51 and connection 42 to the grid of tube 48, where it will appear as a delayed increase in potential which will operate to render tube 48 again conductive and tube 49 non-conductive. Similarly, when this occurs, the plate potential of tube 49 will rise and this change in potential will be applied to the input of the delay line. In the absence of diode 100, included in connection 52 from the output of inverter tube 51 to the grid of tube 48 in the trigger circuit, and so poled as to permit only impulses of positive polarity from tube 51 to be applied to the grid of tube 48, a corresponding negative impulse would subsequently be applied to the grid of tube 48 to cause it to cut off. If, as will generally be the case, the variation in the amount of delay introduced by the variable delay line is restricted to a range of values such that the durations of the negative pulses generated by the trigger circuit and appearing at the plate of tube 49 will always be relatively small compared to the spacing between them, such retriggering of the trigger circuit, by the cutting off of tube 48, will occur considerably in advance of the time at which tube 48 would normally be rendered non-conductive in response to the next negative pulse from diode 47. It will be apparent that such retriggering would be repeated at intervals determined by the magnitude of the delay in the variable delay line, and there would be produced, at the plate of tube 49, a series of pulses of equal duration and spaced by intervals equal to their durations, instead of a single pulse of relatively short duration initiated in response to each of the triggering pips supplied through diode 47 to the grid of tube 48. The inclusion in connection 52 of diode 100, or some similar unilaterally conductive device, appropriately poled, eliminates this difficulty by permitting the application to the grid of tube 48, from the plate of tube 51, of pulses of but a single polarity. Thus when tube 49 has once been rendered conductive in response to a delayed and inverted negative impulse from the plate of tube 49, it will not again be rendered non-conductive until the subsequent application to its grid of a negative triggering pip through diode 47. It will be noted also that preferably there is provided a D. C. connection, through a resistor 101 of suitable value, from the plate of diode 100 to ground. This is to permit dissipation of negative charge which otherwise would accumulate on coupling condenser 102, in response to the negative pips applied to the grid of tube 48, and which would tend to render diode 100 ineffectual to pass positive impulses from tube 51 to the grid of tube 48.

It will, of course, be understood that the invention is susceptible of embodiment in forms other than the one here described by way of example, and for purposes other than the one here specifically mentioned, and that accordingly the invention is subject only to those limitations expressed in the appended claims.

I claim:

1. In a generator of time-spaced pulse signals of varying duration, a source of time-spaced pulse signals, a pulse generator supplied with pulse signals from said source and responsive thereto to initiate the generation of said varying duration pulses, means responsive to the initiations of said varying duration pulses for producing pulses variably delayed with reference to said initiations, means responsive to pulses from said source for altering said delay, and means for applying said delayed pulses to said pulse generator to terminate said varying duration pulses.

2. In a generator of time-spaced pulse signals of varying duration, a source of time-spaced pulse signals, a pulse generator supplied with pulse signals from said source and responsive thereto to initiate the generation of said varying duration pulses, said generator being controllable to vary the durations of pulses generated thereby, means responsive to the initiations of said varying duration pulses for producing pulses variably delayed with reference to said initiations, means responsive to pulses from said source for altering said delay, and means for applying said delayed pulses to said pulse generator to control the durations of the pulses generated thereby.

3. In a generator of time-spaced pulse signals of varying duration, a source of time-spaced pulse signals, a source of a signal of varying characteristic, a pulse generator supplied with pulse signals from said first source and responsive thereto to initiate the generation of said varying duration pulses, means responsive to the initiations of said varying duration pulses for producing pulses variably delayed with reference to said initiations, means responsive to pulse signals from said first source and to said signal of varying characteristic from said second source for controlling said delay, and means for applying said delayed pulses to said pulse generator to terminate said varying duration pulses.

4. In a generator of time-spaced pulse signals of varying duration, a source of time-spaced pulse signals, a pulse generator supplied with pulse signals from said source and responsive thereto to initiate the generation of said varying duration pulses, means responsive to the initiations of said varying duration pulses for producing pulses variably delayed with reference to said initiations, said last-named means being controllable in response to a potential applied thereto to determine the amount of said delay, means for applying a potential to said last-named means to determine said delay, a source of a signal of varying characteristic, means responsive to pulse signals from said source for redetermining the value of said potential applied to said delay device in accordance with the values of said varying characteristic upon the occurrence of said pulse signals from said source, and means for applying said delayed pulses to said pulse generator to terminate said varying duration pulses.

5. In a generator of time-spaced pulse signals of varying duration, a source of time-spaced pulse signals, a pulse generator supplied with pulse signals from said source and responsive thereto to initiate the generation of said varying duration pulses, means responsive to the initiations of said varying duration pulses for producing pulses variably delayed with reference to said initiations, said last-named means being controllable in response to a potential applied thereto to determine the amount of said delay, means including a condenser for developing a potential and for applying said potential to said last-named means to determine said delay, a source of a signal of varying characteristic, means supplied with said signal and with pulse signals from said first-named source, said last-named means being responsive to said pulse signals to redetermine the potential upon said condenser in accordance with the values of said varying characteristic upon the occurrence of said pulse signals, and means for applying said delayed pulses to said pulse generator to terminate said varying duration pulses.

6. In a generator of time-spaced pulse signals of varying duration, a source of time-spaced pulse signals of substantially equal duration, a pulse generator responsive to the trailing edges of said last-named pulse signals for initiating the generation of said varying pulse signals, said generator being controllable to vary the durations of pulses generated thereby, a source of a signal, a characteristic of which varies, and means supplied with said last-named signal and with pulses from said first-named source for controlling said generator to determine the duration of each generated pulse initiated in response to the trailing edge of a pulse from said first-named source in accordance with the value of said varying characteristic upon the occurrence of the leading edge of said last-named pulse.

7. In a generator of time-spaced pulse signals of varying duration, a source of time-spaced pulse signals of substantially equal duration, a source of a signal of varying characteristic, a pulse generator responsive to the trailing edges of pulses from said first-named source to initiate the generation of said varying duration pulses, means responsive to the initiations of said varying duration pulses for producing pulses variably delayed with reference to said initiations, means responsive to pulse signals from said first-named source and to said signal of varying characteristic from said second source for controlling said delay in accordance with the values of said varying characteristic upon the occurrence of the leading edges of pulses from said first-named source, and means for applying said delayed pulses to said pulse generator to terminate said varying duration pulses.

8. Apparatus according to claim 3, in which said source of a signal of varying characteristic comprises a vacuum tube having at least triode elements and means for applying to said tube a plate voltage of sufficient magnitude to operate said tube at plate current saturation, whereby the plate current of said tube is caused to vary in a random manner.

DAVID E. SUNSTEIN.

REFERENCES CITED

The following references are of record in the file of this patent:

UNITED STATES PATENTS

| Number | Name | Date |
| --- | --- | --- |
| 2,405,876 | Crosby | Aug. 13, 1946 |
| 2,433,667 | Hollingsworth | Dec. 30, 1947 |
| 2,462,100 | Hollabaugh | Feb. 22, 1949 |